United States Patent [19]
Connell

[11] Patent Number: 5,725,082
[45] Date of Patent: Mar. 10, 1998

[54] METHOD AND APPARATUS FOR TRANSFERRING BODIES OF SEMI-RIGID TO NON-RIGID STRUCTURE, SLIPPERY SURFACE, AND IRREGULAR SHAPE FROM A BIN OR CONVEYOR TO RECEPTION LINE

[76] Inventor: Douglas R. Connell, 1901 Cypress Rd., St. Cloud, Minn. 56303

[21] Appl. No.: 712,383
[22] Filed: Sep. 11, 1996

Related U.S. Application Data

[60] Provisional application No. 60/003,908, Sep. 18, 1995.
[51] Int. Cl.⁶ .................................................. B65G 17/46
[52] U.S. Cl. ............................................................ 198/471.1
[58] Field of Search .................................... 198/438, 396, 198/459.2, 471.1, 478.1

[56] References Cited

U.S. PATENT DOCUMENTS

| | | | |
|---|---|---|---|
| 2,359,433 | 10/1944 | McNamara | 198/471.1 |
| 2,606,658 | 8/1952 | Powell | 198/438 X |
| 2,633,254 | 3/1953 | Reynolds | 198/471.1 |
| 3,302,803 | 2/1967 | Mooney | 198/471.1 X |
| 3,589,531 | 6/1971 | Povlacs | . |
| 3,941,233 | 3/1976 | Aiuola et al. | . |
| 5,318,165 | 6/1994 | Spatfora et al. | 198/471.1 X |
| 5,381,884 | 1/1995 | Spatafora et al. | . |
| 5,478,193 | 12/1995 | Vonier et al. | 198/396 X |

*Primary Examiner*—James R. Bidwell
*Attorney, Agent, or Firm*—Burd, Bartz & Gutenkauf

[57] ABSTRACT

A method and apparatus for picking up semi-rigid to non-rigid bodies having slippery surfaces and irregular shapes from a bin or conveyor and transferring the bodies one at a time to a reception conveyor. Pick-up devices subjected to a vacuum move up an down as they travel in a circle to pick-up a body in a first location, transport the body to a second location, and deposit the body in a reception conveyor.

21 Claims, 9 Drawing Sheets

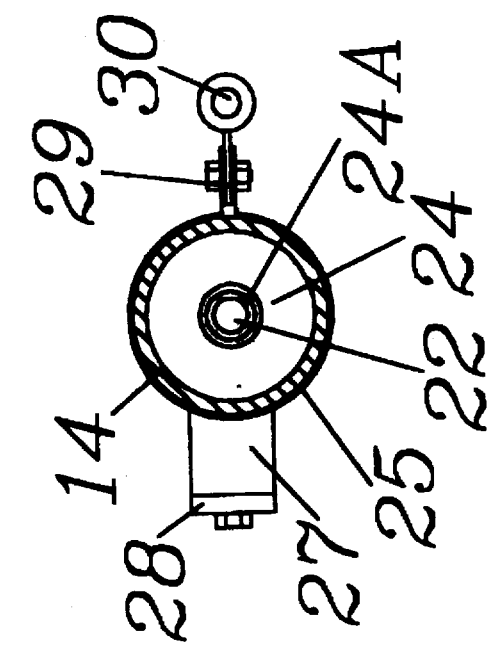
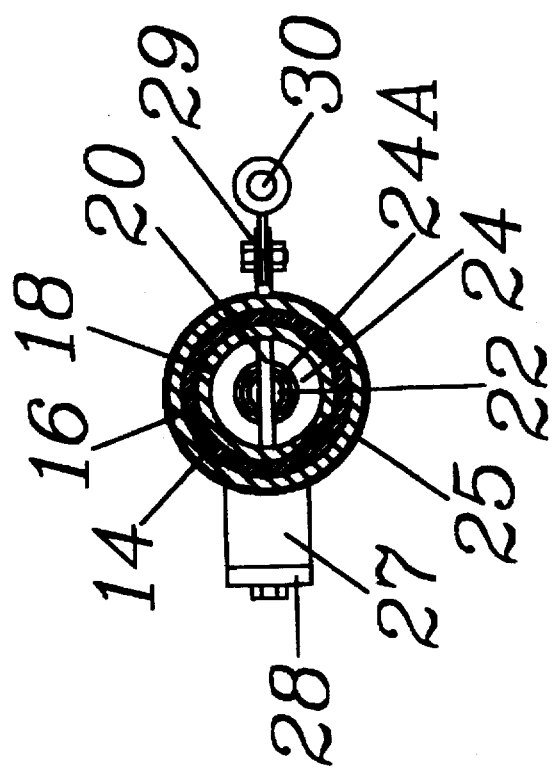

METHOD AND APPARATUS FOR TRANSFERRING BODIES OF SEMI-RIGID TO NON-RIGID STRUCTURE, SLIPPERY SURFACE, AND IRREGULAR SHAPE FROM A BIN OR CONVEYOR TO RECEPTION LINE

CROSS REFERENCE TO RELATED APPLICATION

This application is a continuation-in-part of provisional application Ser. No. 60/003,908 filed Sep. 18, 1995.

FIELD OF THE INVENTION

This invention relates to a method and apparatus for transferring bodies of semi-rigid to non-rigid structure, slippery surface, and irregular shape from a bin or conveyor to a reception line. The apparatus is particularly suitable for transferring fresh raw meat, poultry, and fish located in a bin or conveyor to a reception conveyor.

BACKGROUND OF THE INVENTION

Food processing facilities commonly have operations in which bodies are delivered to a bulk feed bin or a conveyor in random and overlapping fashion. The bodies are then manually removed from a bin or conveyor one at a time and placed into an individual compartment on an exit conveyor. This is a time consuming and tiring repetitive manual task. The exit conveyor transports the individual bodies to a packaging or weighing operation.

Prior art body handling machines for automatically picking up, transporting and releasing bodies of the type described herein are none. The closest prior art is U.S. Pat. No. 3,589,531 to Poviacs (1971). Although machines of this type have been quite satisfactory in operation, they are, nevertheless, subject to inherent limitations including being unable to perform consistently without plugging, being unable to withstand a harsh food processing environment, and not suitable for the sanitary requirements for food processing.

Other prior art article-feeding machines U.S. Pat. No. 3,941,233 to Aluola and Rueff (1976) and U.S. Pat. No. 5,381,884 to Spatafora and Strazzori (1995) need to have the product substantially aligned on the first conveyor or carrier before being transferred, via suction, to a second conveyor.

SUMMARY OF THE INVENTION

The invention relates to a method and apparatus for transferring bodies of semi-rigid to non-rigid structure, slippery surface, and irregular shape from a bin or conveyor to a reception conveyor. The bodies can be arranged in an intermingled and overlapping fashion in the bulk feed bin or conveyor and are removed one at a time by the apparatus. An example of the bodies, are food products, such as poultry meat. The apparatus has a frame supported on a floor. A bin or feed conveyor is mounted on the frame for accommodating a plurality of bodies, herein called objects, in a first location. Object pick-up devices mounted on a rotatable disk move in a circular path are operable to pick-up one object from the first location and transfer the object to a second location above a reception conveyor. The object is released from the pick-up device and deposited in the reception conveyor. Reception conveyor moves the object to a remote location for further processing, packaging, weighing and labeling procedures.

The preferred embodiment of the apparatus has a frame supporting a base. A disk is rotatable supported on rollers connected to the frame. The disk has a flat surface located adjacent a flat bottom surface of the base. A drive unit mounted on the frame rotates the disk at a selected speed. Object pick-up devices are secured to the disk in a circle arrangement adjacent the outer edge of the disk. Each object pick-up device has a fixed tube and a movable tube telescoped on fixed tube. The movable tube is attached to a receptacle having a opening to allow air to flow into the pick-up device. The base has an arcuate groove or manifold open to the disk and aligned with the tubes of the object pick-up devices. A vacuum pump draws air out of the groove and pick-up device during the time that the pick-up devices are aligned with the groove. The air flowing through the opening in the receptacle draws an object from the first location into engagement with the receptacle. The vacuum force established by the vacuum pump retains the object on the receptacle until the vacuum is cut off. A rail assembly mounted on the frame surrounds the object pick-up device has cam tracks that control the up and down movements of the movable tubes and receptacles of the pick-up devices as they move in a circular path. Each pick-up device has a bushing or cam follower engagable with the track so that the movable tube of the pick-up devices follows the route of the tracks. The tracks have a downwardly curved section above the first location which causes the receptacles to be moved down into close proximity with an object in the first location and move up away from the first location as the pick-up device is moved to the second location. The tracks have an upwardly directed section at the second location to move the movable tube of the pick-up device relative to a rod to locate the rod through the opening in the receptacle to mechanically separate the object from the receptacle and deposit the object into a reception conveyor. The reception conveyor has an endless belt and pockets to accommodate the objects. The belt is moved at a speed substantially the same as the circumferential speed of the pick-up device whereby an object is deposited in each pocket of the reception conveyor. The reception conveyor moves the objects to a remote location for further processing, such as packaging, weighing and labeling. The pick-up devices are cleaned with water or a cleaning solution discharged from a nozzle mounted on the base. Water under pressure is supplied to the nozzle. The nozzle directs the water into the tubes and through the opening in the receptacles to clean the insides of the pick-up devices. The disk is rotated with the device unit so that the pick-up devices are sequentially cleaned.

The objects and advantages of the transfer apparatus and method of my invention include:

(a) to provide an automated machine for transferring bodies of semi-rigid to non-rigid structure, slippery surface, and irregular shape from a bin or conveyor to a reception line, and disposed on these lines at constant but different spacing;

(b) to provide a body transfer apparatus whose production allows for a convenient and extremely rapid and economical construction;

(c) to proved a body transfer apparatus that can be built many different sizes to adapt to bodies of different sizes;

(d) to provide a body transfer apparatus that can be completely support from above;

(e) to provide a body transfer apparatus that will not plug and halt operation;

(f) to provide a body transfer apparatus that can be easily cleaned and sanitized;

(g) to provide a body transfer apparatus that can be easily assembled and disassembled; and

3

(h) to provide a body transfer apparatus that can be easily installed into a present equipment configuration.

Still further objects and advantages will become apparent from a consideration of the ensuring description and accompanying drawings.

DESCRIPTION OF THE DRAWINGS

FIG. 7 is an enlarged sectional view taken along line 7—7 FIG. 4;

FIG. 8 is an enlarged sectional view taken along line 8—8 of FIG. 4;

DESCRIPTION OF PREFERRED EMBODIMENT OF INVENTION

Figure 1:
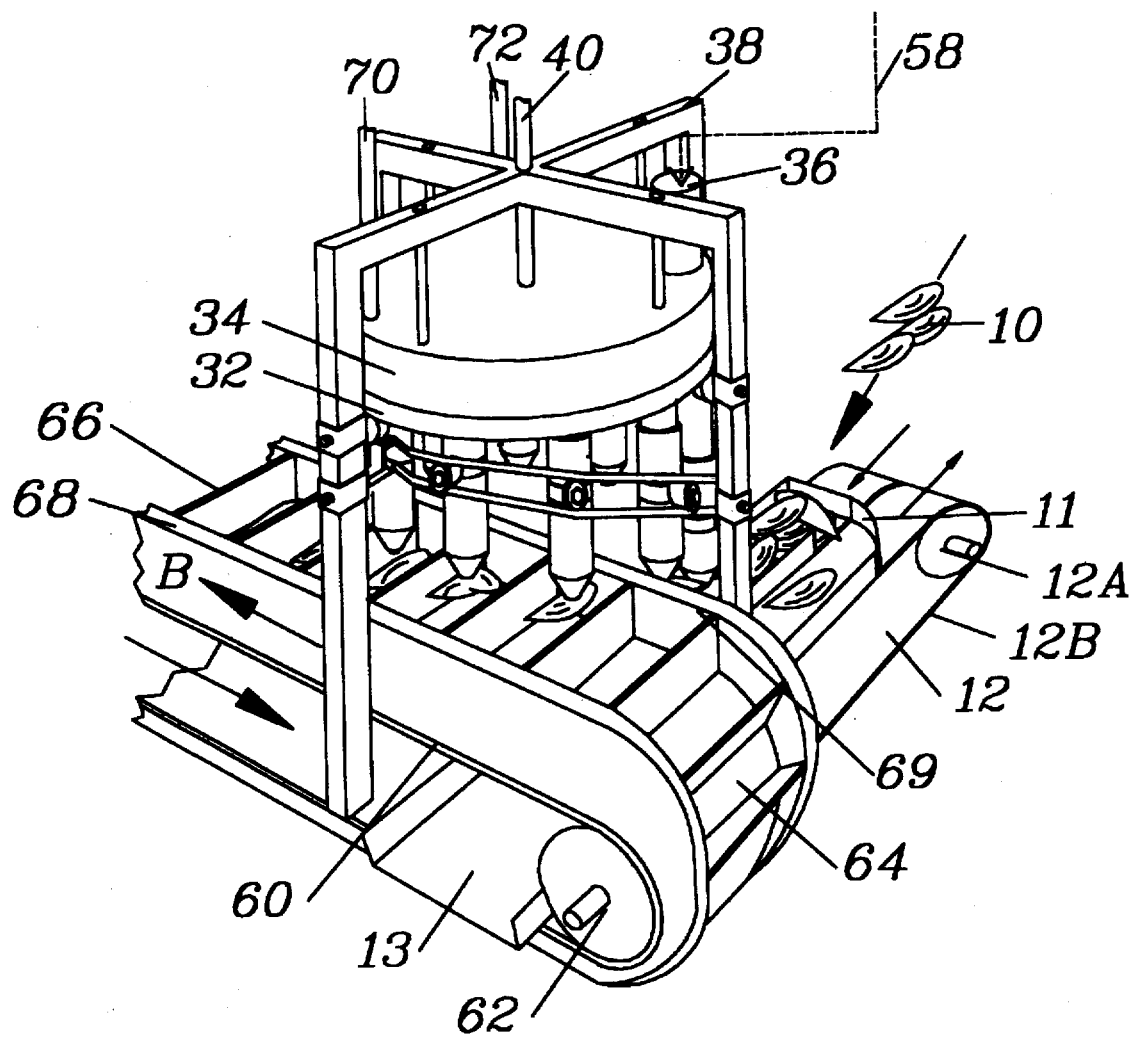
FIG. 1 is a perspective view of the apparatus of the invention for transferring bodies of semi-rigid to non-rigid structure from a first location to a second location.

The object transfer apparatus, indicated generally in FIG. 1 at 9, operates to pick-up an object 10 from a first location, transport the object 10 to a second location and deposit the object in the second location. The object is moved from the second location to a selected third location remote from the apparatus. The object 10 described herein is a food product having an irregular shaped body of semi-rigid to non-rigid structure with a generally slippery outer surface. An example of the product is poultry meat. Other types of non-food products and food products can be handled with the transfer apparatus 9.

Apparatus 9 has an object recirculating conveyor 12 for receiving objects 10 in a first location from an object cutting line of a food processing system. Conveyor 12 has a pair of endless belts 12B trained around separate drive rollers 12A operable to move the upper runs of the belts in opposite directions as shown by the arrows 12C. A curved deflector 11 adjacent the top runs of belts 12B guide objects to adjacent belts to recirculate objects in the first location. Objects 10 are randomly arranged in intermingled and overlapping relative relationship in the first location.

Objects 10 can be directed into a bin or holding structure which provides the first location for the objects. A conveyor or chute can deliver the objects to the bin. Deflector 11 and belts 12B form a bin-like structure for retaining objects in the first location.

An overflow pan 13 is associated with conveyor 12 to channel excess objects 10 if overfilling of the conveyor 12 occurs. Pan 13 is a U-shaped chute which directs objects away from apparatus 9 to a location where the objects can be recycled in the processing system.

Apparatus 9 has a stationary frame, indicated generally at 15, comprising a pair of inverted tubular U-shaped frame members 38. Each U-shaped member 38 has a pair of upright legs and a generally horizontal cross tube or top member. The cross tubes of the U-shaped members are normally disposed relative to each other. The lower ends of the legs rest on the floor or support for apparatus 9.

Figure 4:
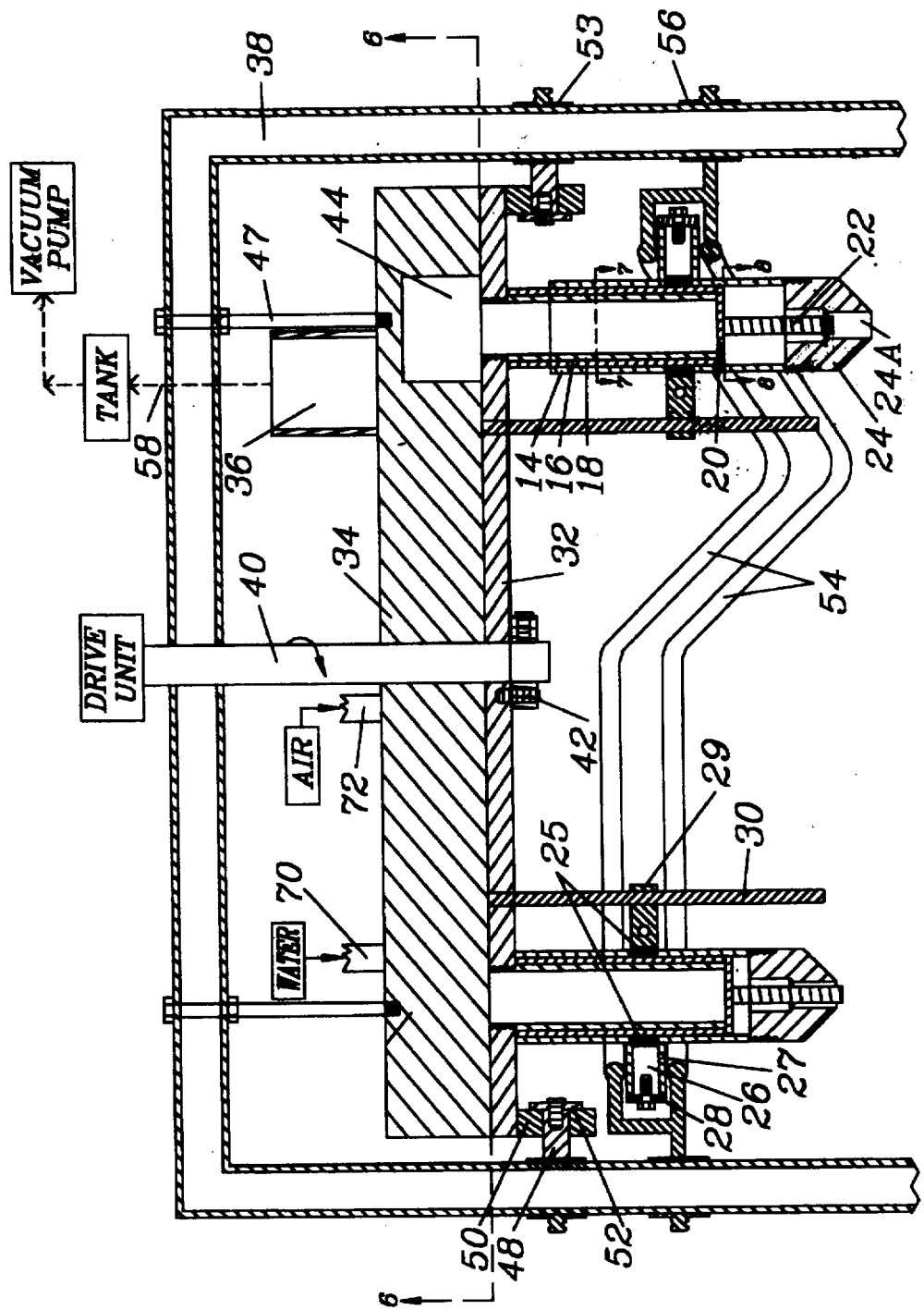
FIG. 4 is an enlarged sectional view taken along line 4—4 of FIG. 3.
Figure 5:
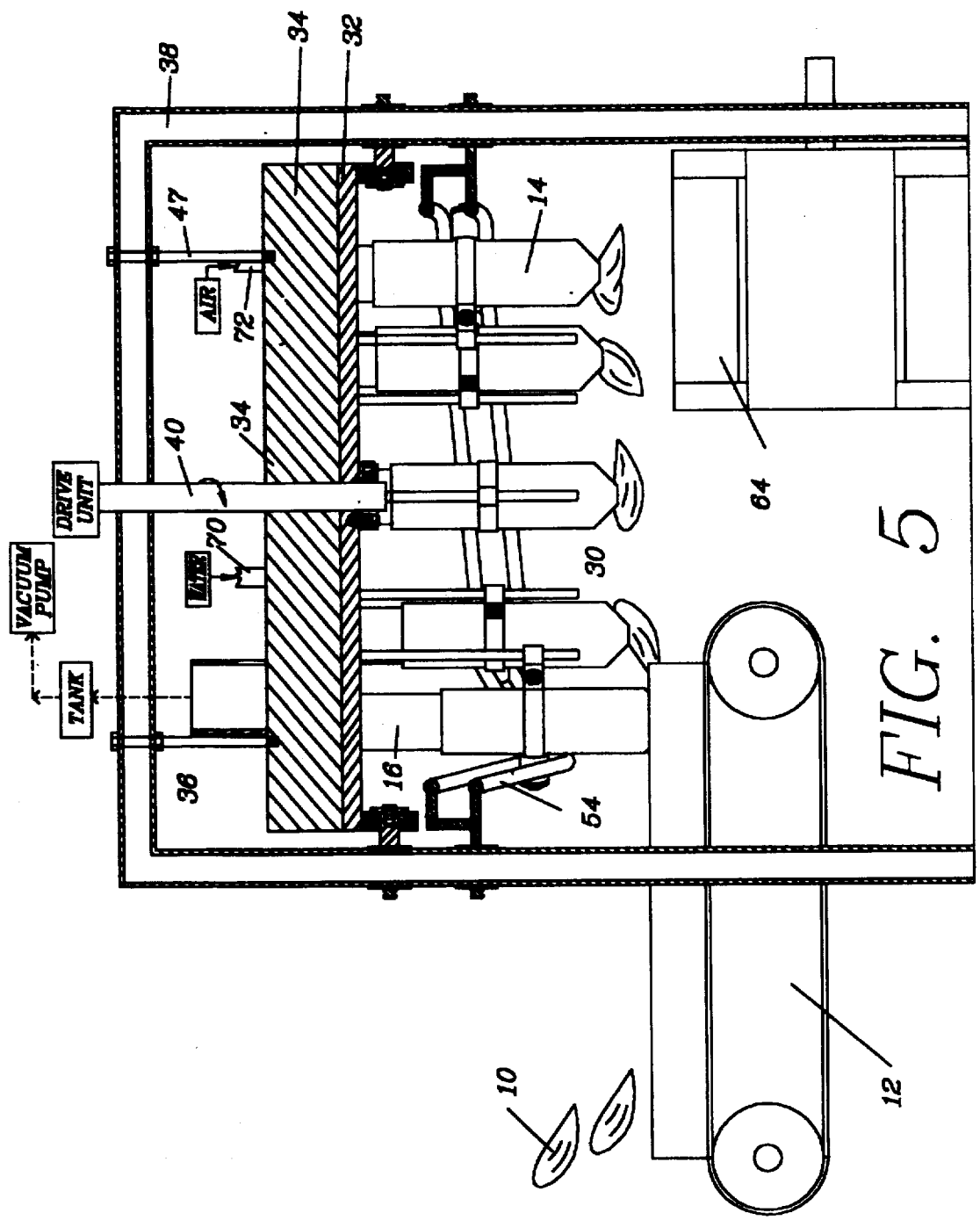
FIG. 5 is an enlarged sectional view taken along line 5—5 of FIG. 3.

An object transfer assembly 30 rotatably mounted on the legs of frame 15 operates to pick-up objects 10 from conveyor 12 and transport the objects to an exit conveyor 60. Transfer assembly 30 has a cylindrical base 34 suspended from cross tubes 38 with a plurality of vertical bolts or rods 47. Base 34 has a flat bottom surface. A rigid disk 32 is positioned in surface engagement with the flat bottom surface of base 34. An upright shaft 40 is fixed to the center of disk 32 and journaled on base 34 and the cross tubes of frame 15. As shown in FIG. 4, a drive unit 41 is operatively connected to shaft 40 to turn disk 32 about the upright axis of shaft 40. A bolt 42 connects a sleeve secured to shaft 40 to disk 32. Disk 32 rides on rollers 50 journaled on studs 48 that are mounted on the legs of frame 15. Washers 52 connected to inner ends of studs 48 maintain rollers 50 on studs 48. Studs 48 are secured to sleeves 53 located about the legs of frame 15. The vertical positions of sleeves 53 on the legs of frame 15 are adjustable to position disk 32 in surface engagement with the flat bottom surface of base 34. A plurality of object pick-up units 18 are mounted on disk 32. The pick-up units 18 are arranged in a circle adjacent the out circular peripheral edge of disk 32. Each pick-up unit 18 has a cylindrical tube 19 surrounded with a bushing 16. The upper end of tube 19 is threaded into a hole in disk 32. Perpendicular to the bottom of tube 19 and bisecting its circumference in two equal parts is a support bar 20. Bar 20 has a length greater than the outside diameter of tube 19 so that it retains busing 16 on tube 19. As shown in FIG. 7, the width of bar 20 is less than the diameter of the passage of tube 19 so that air flows past bar 20 into the passage of tube 19. A plunge rod 22, shown as a solid cylindrical rod, is fixed with its top horizontal center point joined to the midpoint of bar 20. A cylindrical tube 14 is telescoped on bushing 16 for sliding up and down movements. Tube 14 has a lower portion that extends below the bottom of tube 19. An object receptacle 24 is secured to the lower end of tube 14. Receptacle 24 has a cone shaped bottom surface and a vertical orifice or passage 24A open to the interior of the passage of tube 14 and the bottom of receptacle 24. Passage 24A is smaller in diameter at its lower end than at its upper end. The smaller diameter extends upward to about the middle of passage 24A.

Clamp 25 is a rectangular member that is formed to fit in a groove on the outside of tube 14 and mounted on tube 14. A short shaft 26, shown as a solid rod, is secured to and extends outwardly from clamp 25. A cylindrical bushing 27 is rotatable carried on shaft 26. A stop washer 28 attached to shaft 26 retains bushing 27 on shaft 26. Clamp 25 has an inwardly directed arm 29 having a vertical hole accommodating a guide post 30. The upper end of post 30 is secured to disk 32. Post 30 prevents rotation of clamp 25 on tube 14 and allows vertical up an down movement of clamp 25 and tube 14 relative to base 34.

Figure 2:
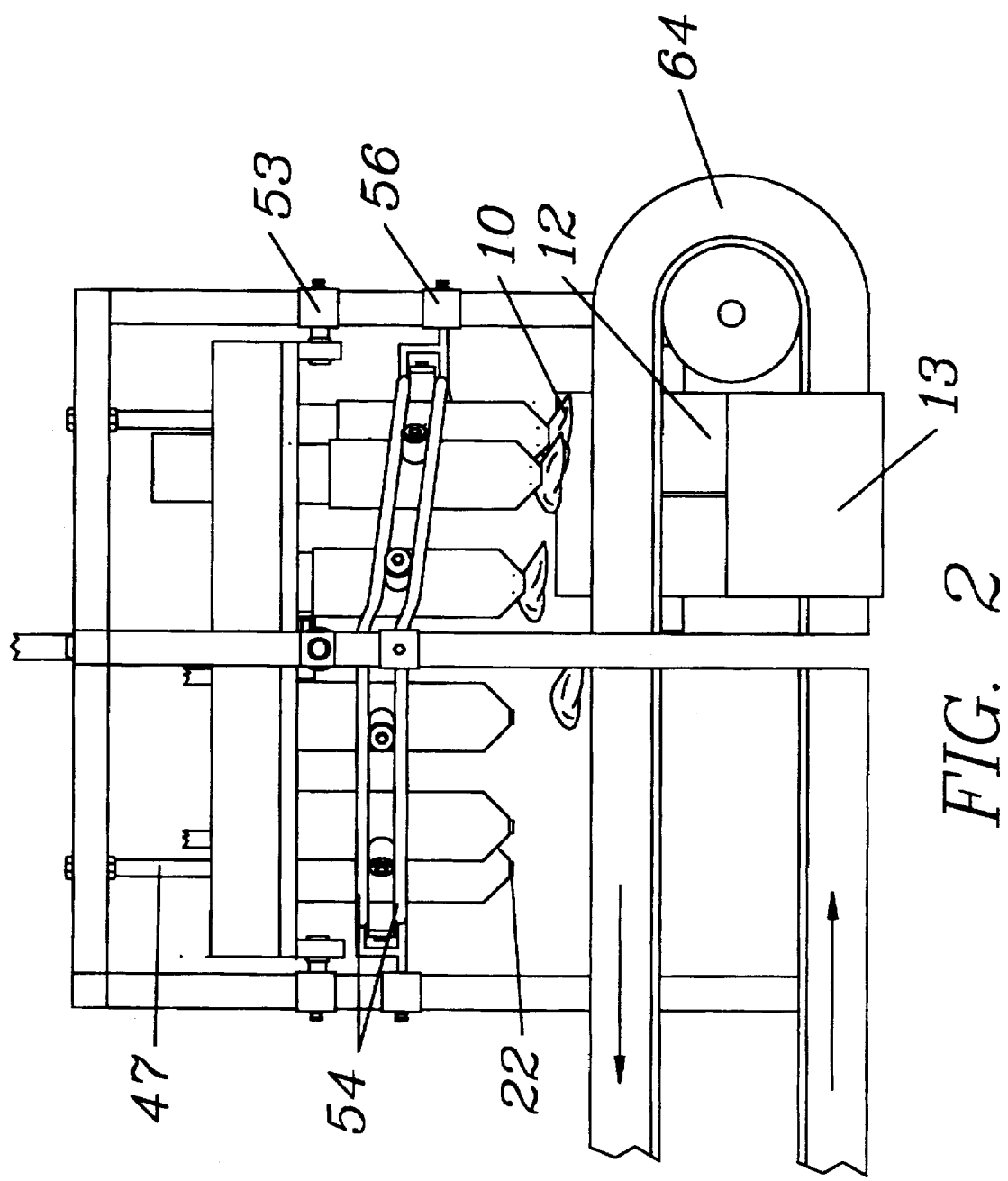
FIG. 2 is an elongated front elevational view thereof.
Figure 9:
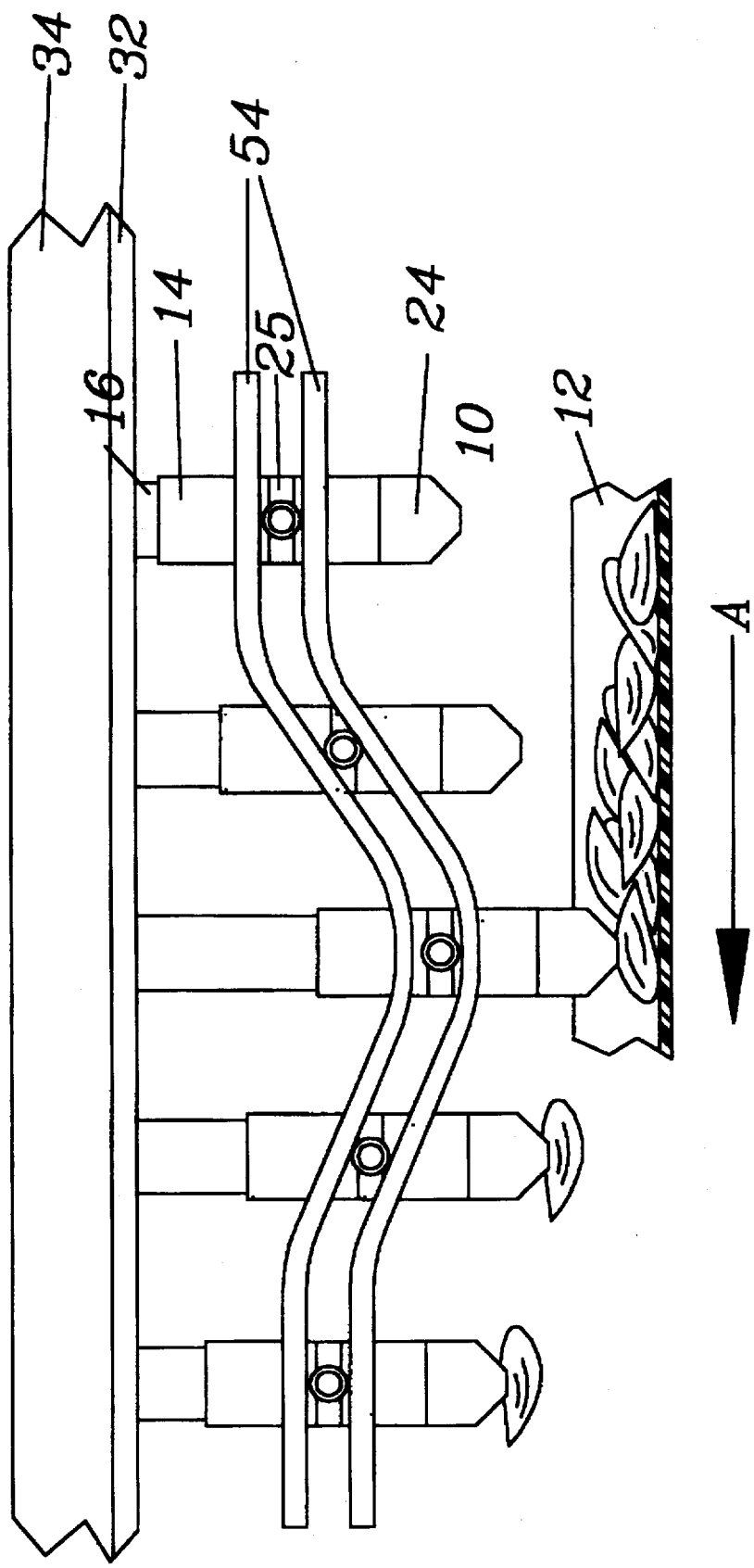
FIG. 9 is an enlarged side elevational view of the apparatus showing the body pick-up operation.
Figure 10:
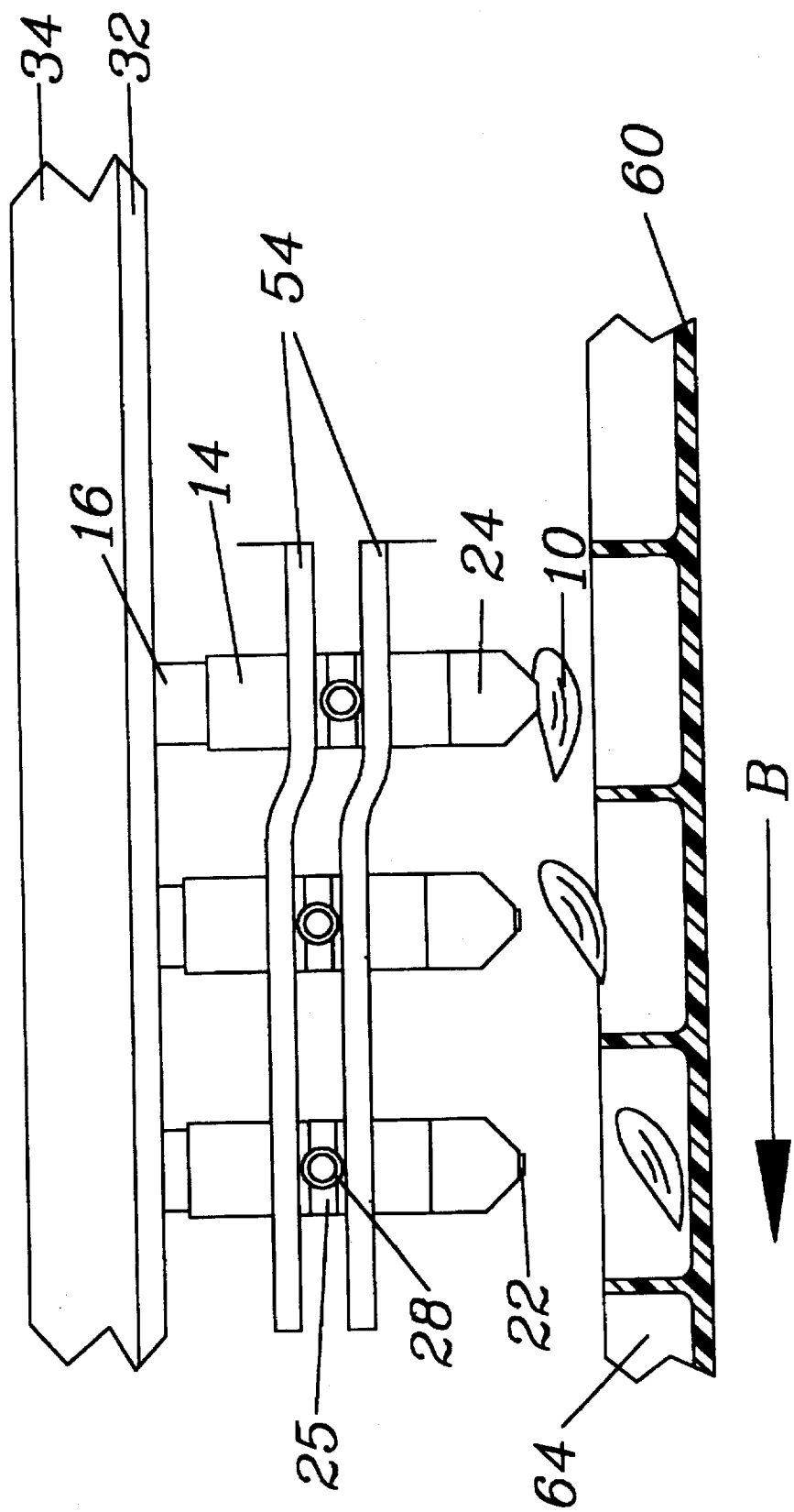
FIG. 10 is an enlarged side elevational view of the apparatus showing the body release operation.

Bushing 27 is a cam follower that rides on a rail assembly 54 to control the up and down movements of receptacle 24 as the pick-up unit 18 moves in its circular path. Rail assembly 54 is a circular rods or track members having inwardly located beads. The rods are vertically spaced from each other and serve as tracks or guides for bushing 27. Rail assembly 54 is mounted on frame 15 with channel brackets and sleeves 56. Set screws secure sleeves 56 to frame 15. The set screws and sleeves 56 permit vertical adjustment of rail assembly 54 thereby adjusting the upper and lower locations of receptacle 24. As shown in FIG. 9, rail assembly 54 has a downwardly curved section 54A located about the first location containing objects 10 on conveyor 12. As shown in FIG. 10, rail assembly 54 has a short upwardly curved section 54B above the second location for accommodating objects 10 in exit conveyor 60. Returning to FIG. 2, rail assembly 54 inclines upwardly from section 54A to section 54B to elevate objects from conveyor 12 to a position above reception conveyor 60.

Figure 6:
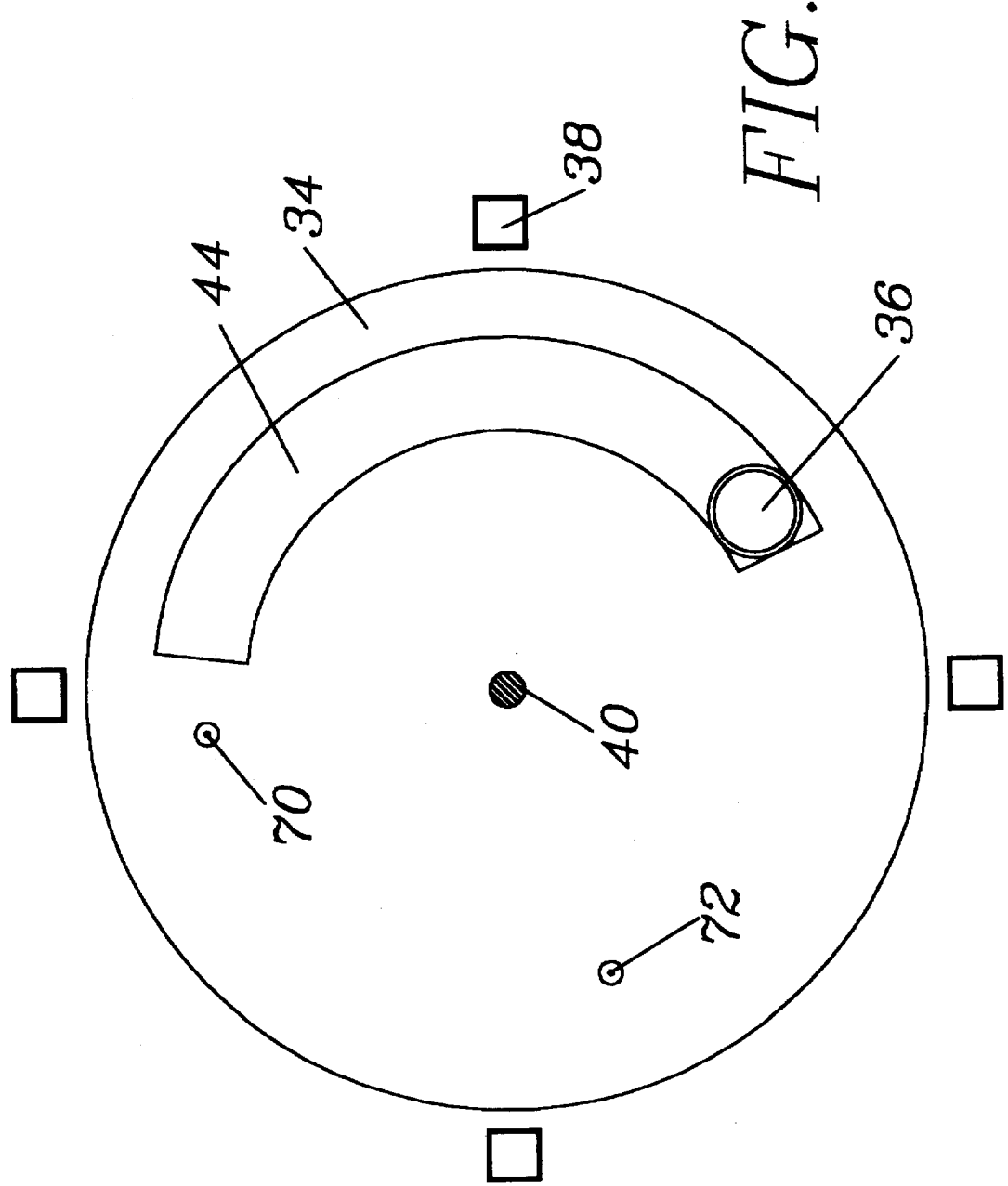
FIG. 6 is a sectional view taken along line 6—6 of FIG. 4.

As shown in FIG. 6, base 34 has an arcuate groove 44 or vacuum manifold open to the upper ends of tubes 19. Groove 44 has an arcuate extent of about 150 degrees from above the first location to above the second location. A pipe or conduit 36 mounted on base 34 is open to groove 44. As shown in FIG. 4, conduit 36 is connected with a line 58 to a tank and vacuum pump operable to draw air from groove 44 and pick-up devices 18 that move under groove 44. The vacuum force and air moving through port 24A of receptacle 24 picks-up and hold objects on receptacle 24 as it moves from the pick-up first location to the discharge second location onto conveyor 60.

The exit or reception conveyor 60 has a flexible closed loop belt 64 located about rollers 62. Belt 64 has side walls 69 and transverse flat member or projections 66 extended between the side walls 69 to provide pockets for accommodating objects. Belt 66 is driven at a speed approximately constant and equal to the peripherial speed of the pick-ups devices 18 so that the pick-up devices 18 deposit one object in each pocket. The conveyor 60 moves the objects to a third location remote from the apparatus for packaging, weighing, labeling procedures.

Figure 3:
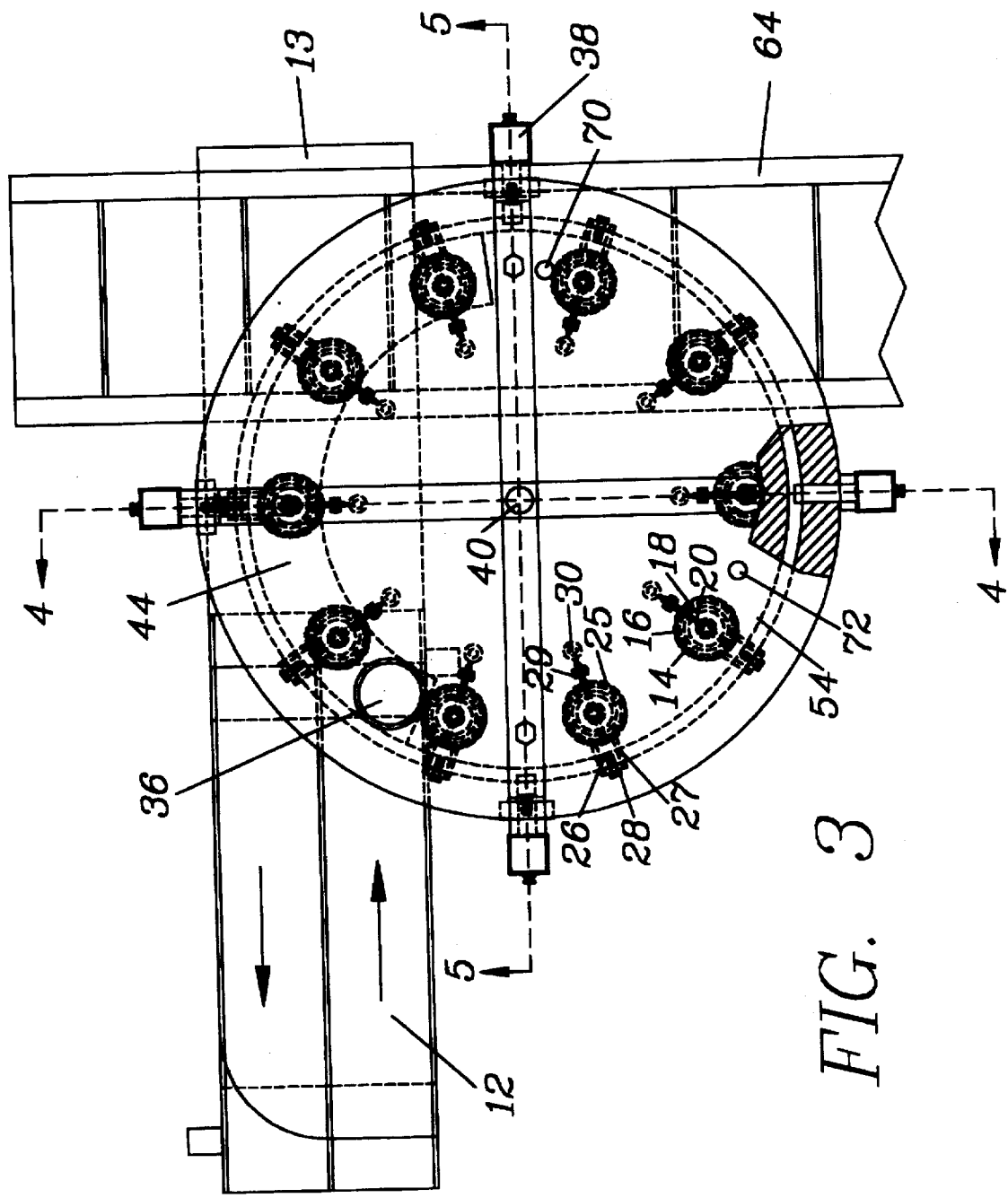
FIG. 3 is a top plan view partly sectioned thereof.

As shown in FIGS. 3 and 6, an air nozzle 72 and water nozzle 70 is mounted on base 34 over separate holes through the base. The holes are aligned with the passage of tubes 19 as the pick-up devices 18 turn relative to base 34. Air nozzle 72 is connected to a clean air supply for applying air under pressure downward toward the pick-up device 18.

Water nozzle 70 is connect to a clean water supply (not shown) or a cleaning solution supply (not shown) mounted on base 34 in communication with a hole aligned with pick-up devices 18. Clean water also can be supplied to groove 44 to clean the inside of base 34 and the pick-up devices.

In use of apparatus 9 the drive unit turns disk 32 to move the pick-up devices 18 in a circular path. The vacuum source operates to withdraw air from groove 44 and move air through the pick-up devices 18 that are in communication with the groove 44. Vacuum is not supplied to pick-up devices 18 that are not aligned with groove 44. Bushings 27 engagable with rail assembly 54 control the up and down movements of pick-up devices 18. When the pick-up devices 18 move toward the first location they travel downward into the first or pick-up location. The pick-up devices 18 also extend downward. Receptacle 24 is in close relationship to an object 10 on conveyor 12. The receptacle 24 may be moved into direct engagement with the object 10 on conveyor 12. The vacuum force and air moving into receptacle orifice 24A move the object up into holding engagement with the receptacle 24. The vacuum force retains the object on the receptacle 24. The vacuum force is maintained as long as the pick-up devices 18 are aligned with groove 44. The pick-up devices 18 move the objects upwardly away from the first location and transport the objects to a second location above the exit conveyor 60. As shown in FIG. 10, when pick-up device 18 is above conveyor 60, the vacuum force is cut-off and the bushing rides up track section 54B. This causes rod 22 to move through orifice 24A thereby pushing the object off receptacle 24. The object 10 falls onto conveyor 60. Air under pressure can be supplied to nozzle 72 to facilitate removal of the object from receptacle 24 and direct the object on to conveyor 60. A friction conveyor belt can also be use used to assist in removal of the object from the receptacle 24.

The apparatus can be cleaned by supplying water under pressure to nozzle 72. Disk 32 is rotated during the time that the water is supplied to nozzle 72. Water directed into the insides of pick-up devices 18 flushes foriegn material from the pick-up device 18.

Object transfer apparatus 9 is used to remove an individual object or product from a large group of intermingled and overlapping objects in a bin or on a conveyor and carry the objects to a location above a compartmentalized exit conveyor and deposit the objects into separate pockets in the exit conveyor. Apparatus 9 is economical in construction and use and is easy to clean and maintain. Frame 15 supports apparatus 9 above the object transfer operation so as to conserve desirable floor space. Furthermore, apparatus 9 is adaptable to current equipment configuration.

Although the description of the object transfer apparatus 9 contains many specificities, these should not construed as limiting the scope of the invention but as merely providing illustrations of the presently preferred embodiment of this invention. Various other embodiments and ramifications are possible within its scope. For example, the transfer device could pick up flexible pouches one at a time from a bin or conveyor of intermingled and overlapping flexible pouches. The invention is defined in the following claims.

I claim:

1. A method of transferring objects from a first location to a second location comprising:

locating an object pick-up means above the first location containing at lest one object, moving the object pick-up means downwardly toward and in close proximity to the object in the first location, applying a vacuum to said pick-up means to move the object into engagement with the pick-up means and retain the object on said pick-up means, moving the pick-up means and object retained thereon during the application of vacuum to said pick-up means upwardly above said first location, transporting the pick-up means and object retained thereon during application of vacuum to said pick-up means from above said first location a ta position above the second location, releasing the object from the pick-up means whereby the object moves away from the pick-up means to the second location, and cleaning the pick-up means after the object has been released from the pick-up means.

2. The method of claim 1 including:

randomly arranging a plurality of objects in intermingled and potentially overlapping relative relationship in the first location.

3. The method of claim 1 including:

placing a plurality of objects in a bin residing in the first location.

4. The method of claim 1 including:

placing a plurality of objects on a conveyor located in the first position.

5. The method of claim 1 wherein:

the pick-up means and object retained thereon are transported in a generally circular path from above first location to a position above the second location.

6. The method of claim 1 including:

moving the object in the second location from the second location to a third location.

7. The method of claim 6 wherein:

the object is moved along a path away from the first location at a continuous speed.

8. The method of claim 1 wherein:

the pick-up means is cleaned by subjecting the pick-up means with flowing liquid dispensed from a nozzle aligned with the pick-up means.

9. The method of claim 1 wherein:

the object is released from the pick-up means by subjecting the object retained on the pick-up means with air under pressure whereby the object is placed in the second location.

10. A method of transferring bodies having irregular shapes, semi-rigid to non-rigid structure and slippery surfaces one at a time in a singulating manner from a first means for supporting the bodies to a conveyor comprising:

randomly arranging a plurality of bodies in intermingled and overlapping relative relationship on the first means, locating a pick-up means for picking up one body from the first means above the first means and bodies on the first means, moving the pick-up means in a downward direction to close proximity to the plurality of bodies on the first means, applying a vacuum to the pick-up means to move one body of the plurality of bodies into engagement with the pick-up means and retain the one body on the pick-up means, moving the pick-up means and the one body retained thereon during application of vacuum to the pick-up means in an upward direction to a first location above the first means, transporting the pick-up means and the one body retained on the pick-up means during application of vacuum to the pick-up means from the first location to a second location above the conveyor, releasing the one body from the pick-up means to allow the body to fall away from the pick-up means onto the conveyor, and moving the conveyor to carry the one body to a third location remote from the bin.

11. The method of claim 10 wherein:

the pick-up means for picking up one body and the one body retained thereon are transported in a generally circular path from the first location above the first means to the second location above the conveyor.

12. The method of claim 10 including:

moving the conveyor at a continuous speed to locate bodies released from the pick-up means in spaced relation along the conveyor.

13. A method of transferring bodies having irregular shapes, semi-rigid to non-rigid structure and slippery surfaces one at a time in a singulating manner from a first means for holding the bodies to a conveyor comprising:

randomly arranging a plurality of bodies in intermingled relative relationship in the first means, locating a pick-up means for picking up one body from the first means above the first means and bodies in the first means, moving the pick-up means in a downward direction to close proximity to one body in the first means, applying a vacuum to the pick-up means to move the one body into engagement with the pick-up means and retain the body on the pick-up means, moving the pick-up means and the one body retained thereon during application of vacuum to the pick-up mean in an upward direction to a first location above the first means, transporting the pick-up means and the one body retained on the pick-up means during application of vacuum to the pick-up means from the first location to a second location above the conveyor, releasing the one body from the pick-up means to allow the body to fall away from the pick-up means onto the conveyor, and moving the conveyor to carry the body to a third location remote from the bin, and cleaning the pick-up means for picking up one body after a plurality of bodies have been released from the pick-up means.

14. The method of claim 13 wherein:

the pick-up means for picking up one body is cleaned by subjecting the pick-up means with flowing liquid.

15. The method of claim 13 wherein:

the one body is released from the pick-up means for picking up one body by subjecting the one retained on the pick-up means with air under pressure whereby the one body is placed on the conveyor.

16. An apparatus for transferring objects from a first location to a second location comprising:

a frame, first means mounted on the frame for holding a plurality of objects, second means for moving objects away from the first means, third means for picking up objects from the first means and depositing the objects on the second means, said third means including a movable member, and a support mounted on the frame, said support having a bottom surface and a chamber open to the bottom surface, said member being located in engagement with said bottom surface, means supporting the member on the frame for movement relative to the first and second means, drive means for moving the member, an object pick-up device mounted on the member having a lower open end and a passage open to the chamber, said object pick-up device being operable to pick-up an object in the first mean, transport the object to a location above the second means and release the object thereby allowing the object to be placed onto the second means, and means to apply a vacuum to the chamber whereby flowing air is drawn through the lower open end and passage of the pick-up device, said flowing air and vacuum being operable to move an object into engagement with the pick-up device and retain the object on the pick-up device.

17. The apparatus of claim 16 wherein:

the first means is a bin for holding a plurality of objects.

18. The apparatus of claim 16 wherein:

the first means is a conveyor for holding a plurality of objects.

19. The apparatus of claim 16 wherein:

the second means is a conveyor for sequentially receiving objects and carrying the objects to a location remote from the first means.

20. The apparatus of claim 16 wherein:

the pick-up device comprises
- a first tube having a passage open to the chamber mounted on the member,
- a second tube having a passage open to the passage in the first tube located in telescopic relationship relative to the first tube,
- a receptacle mounted on the second tube, said receptacle having an opening in communication with the passage in the second tube, and
- means to move the second tube relative to the first tube during movement of the member so that the receptacle moves downwardly in close proximity to an object in the first means to allowing the flowing air and vacuum to pick-up an object and then move upward and transport the object to the second means.

21. The apparatus of claim 20 wherein:

the means to move the second tube relative to the first tube comprises,
- a cam track mounted on the frame, and
- a cam follower engageable with said track mounted on the first tube.

* * * * *